March 30, 1965 M. A. PAUL 3,175,537
APPARATUS FOR GROOMING AND APPLYING
INSECTICIDE TO AN ANIMAL
Filed May 13, 1963 3 Sheets-Sheet 3

INVENTOR
MILTON A. PAUL
BY
ATTORNEY (United States Patent Office — 3,175,537 — Patented Mar. 30, 1965)

3,175,537
APPARATUS FOR GROOMING AND APPLYING
INSECTICIDE TO AN ANIMAL
Milton A. Paul, Odebolt, Iowa
Filed May 13, 1963, Ser. No. 279,956
4 Claims. (Cl. 119—157)

This invention relates to a brush apparatus which is contacted by an animal and operates to groom the body of the animal and apply insecticide thereto.

It is the object of the invention to provide an improved power driven brush apparatus which is animal actuated and operable to scratch the body of the animal and concurrently apply insecticide to those parts of the body of the animal which contact the brush apparatus.

Another object of the invention is to provide an animal scratcher or brush apparatus having power driven brush means with predetermined portions adapted to selectively or concurrently engage the back and one side of an animal.

A further object of the invention is to provide an automatic animal brush apparatus which is animal operated in response to either the position of the animal adjacent the apparatus or to upward movement of the apparatus caused by the animal.

Still another object of the invention is to provide an animal brush apparatus which is resiliently supported so as to accommodate and be actuated by animals of varying sizes.

An additional object of the invention is to provide a rugged and dependable animal brush apparatus which is reliable and versatile in use and economical in construction.

These and other object and advantages of this invention will become apparent from a consideration of the following specification relating to the accompanying drawings in which:

FIG. 4 is a sectional view taken along the line 4—4 of FIG. 1;

FIG. 5 is an elevation view taken in the plane of the line 5—5 of FIG. 1;

FIG. 6 is a sectional view taken along the line 6—6 of FIG. 1; and

Figure 1:
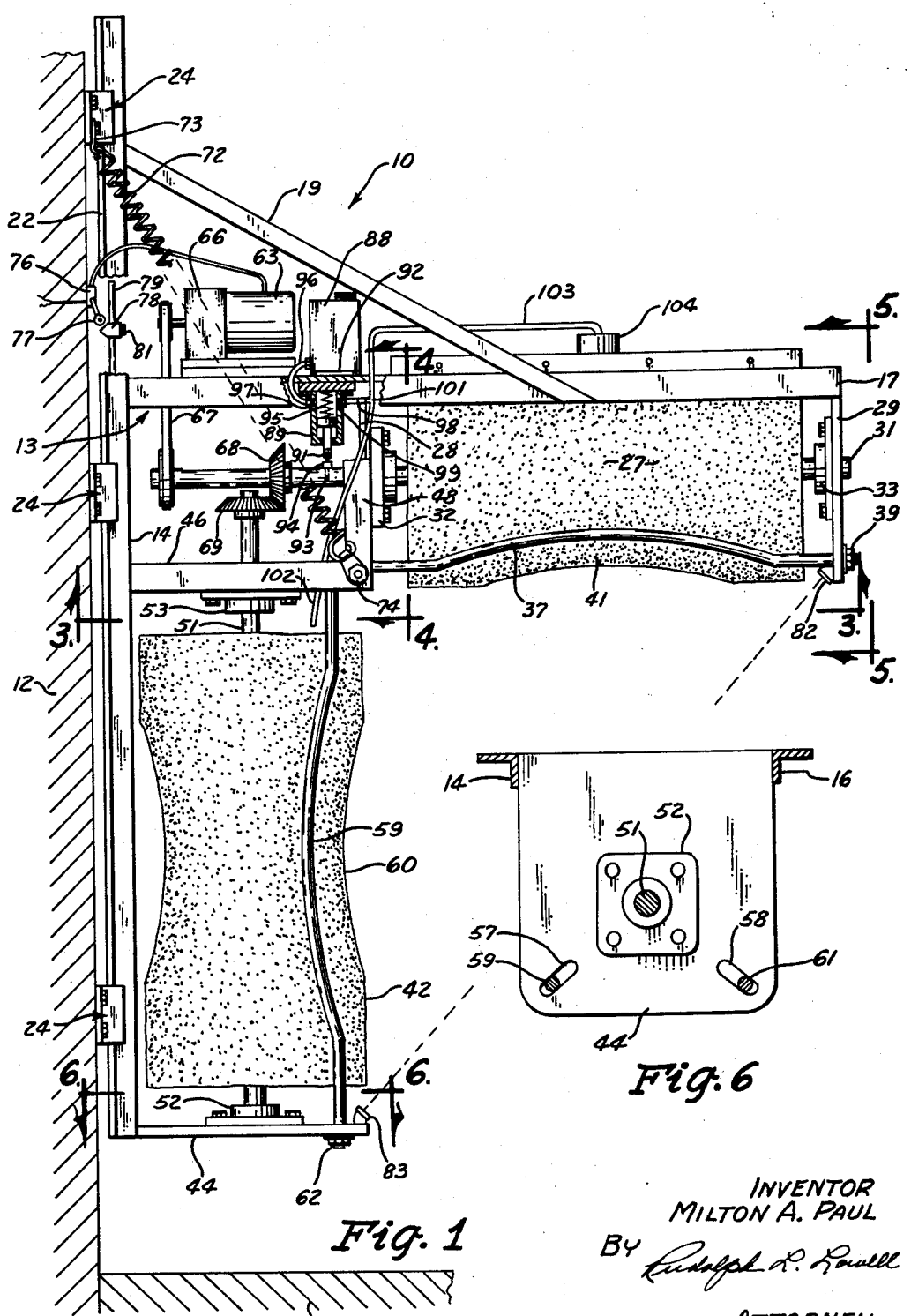
FIG. 1 is a side elevation view of the brush and insecticide applicator apparatus of the invention.
Figure 2:
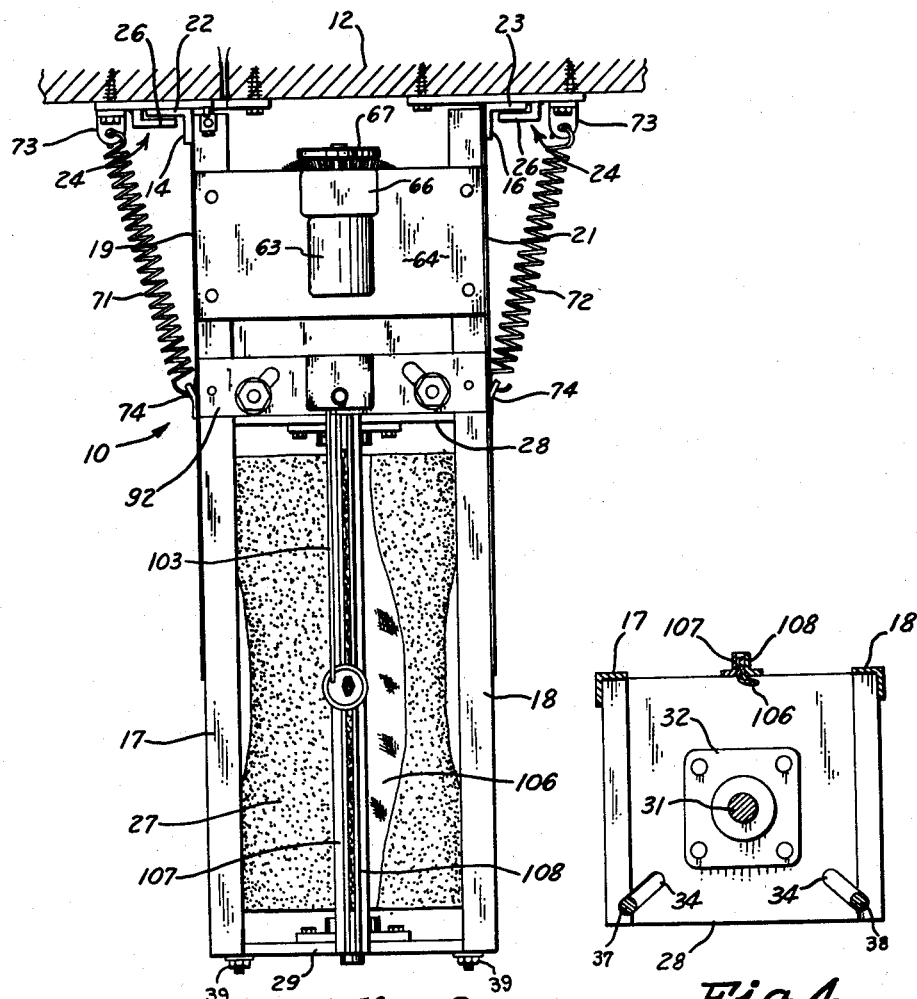
FIG. 2 is a top view of the apparatus of FIG. 1.

Referring to the drawing, there is shown in FIGS. 1 and 2, the animal brush apparatus of the invention indicated generally by the numeral 10. The apparatus is normally located in an animal feed lot where it is accessible to animals, such beef cattle. In the operating position, the apparatus 10 is elevated above the surface of the ground 11 and supported on an upright structure 12, such as a building wall or post.

The apparatus 10 has an inverted L-shaped frame 13 (FIG. 1) which comprises a pair of spaced parallel upright angle beams 14 and 16 (FIG. 2) and horizontal angle beams 17 and 18. The inner end sections of the angle beams 17 and 18 are secured to the upper end sections of the angle beams 14 and 16 respectively so that the angle beams 17 and 18 extend laterally in a horizontal direction from the upright beams 14 and 16. A pair of diagonal braces 19 and 21 (FIG. 1) are secured to the top ends of the angle beams 14 and 16 and extend outwardly in a downward direction for connection with the midsections of the angle beams 17 and 18.

As shown in FIG. 2, the upright angle beams 14 and 16 are positioned so that one of the flanges of each beam extends substantially parallel to the upright structure 12 with the flange 22 of the beam 14 extended in an opposite direction from the flange 23 of the beam 16. The frame 13 is slidably mounted on the upright structure 12 for movement in a vertical direction by means of a plurality of spaced guide members 24 which are positioned about and cooperate with the flanges 23 and 24 of the upright beams 14 and 16. Each guide member 24 has an L-shaped arm 26 which extends over the flanges 22 and 23 of the associated upright angle beams. The guide members 24 are vertically spaced with three guide members, as shown in FIG. 1, being positioned over each flange of the respective angle beams 14 and 16.

A horizontally extended cylindrical brush 27 is supported below the angle beams 17 and 18 by an inside plate 28 and an outside plate 29. The plates 28 and 29 are of a substantially square shape and have the top curves thereof secured to the angle beams 17 and 18 so as to be suspended downwardly from the beams. The horizontal brush 27 has stiff radial bristles secured to a central supporting shaft 31 which is rotatably mounted by bearings 32 and 33 secured to the center areas of the plates 28 and 29, respectively. As shown in FIGS. 4 and 5, the lower corner sections of each plate 28 and 29 have diagonally extended slots 34 and 36, respectively. A pair of parallel bumper bars 37 and 38 (FIGS. 1 and 3) extend horizontally of the brush 27 and are connected at their opposite ends to the plates 28 and 29 by nut assemblies 39 which are threaded on the ends of the bumper bars 37 and 38 and extend through the slots 34 and 36 in the respective plates. The slots 34 and 36 permit the bars 37 and 38 to be moved in a direction radially of the axis of rotation of the brush 27 thereby adjusting the extent of the brush 27 which projects radially beyond the bars 37 and 38. In order to accommodate for the curvature of the back of an animal, the brush 27 has a concave center section 41 and each of the bars 37 and 38 is curved in an upward direction.

Figure 3:
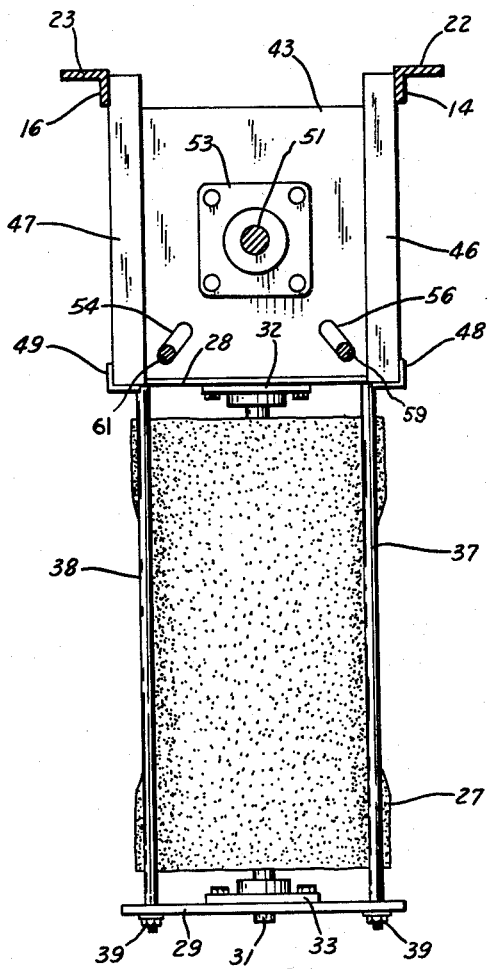
FIG. 3 is a sectional view taken along the line 3—3 of FIG. 1.

An upright brush 42, similar in construction to brush 27, is supported on the angle beams 14 and 16 by means of an upper plate 43 and a lower plate 44 of a substantially rectangular shape having a pair of opposite corner sections secured to the angle beams 14 and 16 so as to extend laterally in the direction of the angle beams 17 and 18. The upper plate 43 and the inside plate 28 extend at right angles to each other and have a common edge. As shown in FIG. 3, a pair of outwardly extended angle plates 46 and 47 and a pair of upwardly extended angle plates 48 and 49 are positioned over the sides of the plates 28 and 43 and are secured to the frame 13 to reinforce the position of the plates 28 and 43 with respect to the frame 13. The brush 42 shown in FIG. 1 is supported on a central shaft 51 which is rotatably mounted on the plates 43 and 44 by bearings 52 and 53 secured to the center areas of the respective plates.

As shown in FIG. 3, the corners of plate 43 remote from the angle beams 14 and 16 have slots 54 and 56 which extend radially toward the shaft 51. The lower plate 44 has complementary radial slots 57 and 58 as illustrated in FIG. 6. Parallel upwardly extending bumper bars 59 and 61 engage at their opposite ends the plates 43 and 44. Nut assemblies 62 secure the ends of the bars 59 and 61 to the respective adjacent plates. The radial slots permit the bars 59 and 61 to be adjusted in a radial direction so as to expose varying amounts of brush to the animal. The bars 59 and 61 limit the amount of brush which is exposed to the animal. In order to accommodate for the curvature of the side of an animal, the brush 42 has a concave center section 60 and each of the upright bars 59 and 61 is curved toward the center section 60 of the brush.

Referring to FIGS. 1 and 2, the brushes 27 and 42 are power driven by an electric motor 63 which is mounted on a plate 64 secured to the inner end sections of the angle beams 17 and 18. The motor 63 has a gear reduction unit 66 which is drivably connected to the shaft 31 of the brush 27 by means of a belt and pulley assembly 67. A pair of interengaging bevel gears 68 and 69 mounted on the shafts 31 and 51, respectively, transmit power to the upright brush 42.

The apparatus 10 is resiliently biased in an upward direction by a pair of tension springs 71 and 72 which are connected at their upper ends by brackets 73 to the top guide members 24. The lower end of each spring 71 and 72 is connected to the outer end of the angle plates 46 and 47 by brackets 74. The springs 71 and 72 bias the apparatus 10 in an upward direction and provide a floating action so that the apparatus may be readily lifted for partial support on the back of an animal positioned thereunder. The angular position of the springs 71 and 72 counteracts the overhang of the horizontal brush 27 thereby reducing the binding of the flanges 22 and 23 with the guide members 24.

The electric motor 63 is connected to a source of energy (not shown) by means of a switch 76 mounted on the upright structure 12. The switch 76 has a control lever 77 which is positioned in the path of movement of an adjustable cam 78. An upright rod 79 secured to the angle beam 17 extends through the cam 78. A set screw 81 threadably mounted in cam 78 and engageable with the rod 79 maintains the adjusted position of the cam 78 relative to the rod 79. When the frame 13 is moved in an upward direction the cam 78 engages the control lever 77 of the switch 76 thereby connecting the electric motor 63 to the source of electric energy.

Electric motor 63 may be selectively connected with the source of electric energy by means of an electric eye control which is positioned across the area between the brush 42 and under the brush 27. The electric eye control has a signal sending element 82 secured to the plate 29 and a signal sensing element 83 secured to the lower plate 44. When an animal moves into the light beam between the sending element 82 and the sensing element 83 the motor 63 will be energized thereby operating the brushes 27 and 42.

Figure 7:
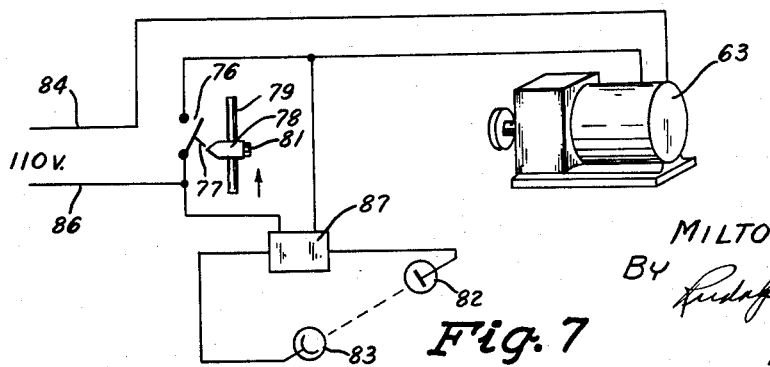
FIG. 7 is a diagram of the electrical circuit for the electric motor of the apparatus of FIG. 1.

The dual control electric circuit for the motor 63 is shown in FIG. 7. The 110 v. power supply is connected to lines 84 and 86. Switch 76 is interposed in the line 86 and is operable in response to reciprocal movement of the cam 78 to open and close the switch 76. Alternatively, the line 86 may be connected to the motor 63 by the electric eye control switch 87 which is connected in parallel with the switch 76. The control switch 87 is triggered when the light beam generated by the sending element 82 is intercepted and fails to strike the sensing element 83. Thus a small animal may use the upright brush without raising the apparatus 10 to trip the switch 76.

During the operation of the brushes 27 and 42 limited amounts of a liquid insecticide are applied to the brushes so that the brushes may operate to evenly distribute insecticide on the body of the animal. The insecticide is pumped from a reservoir 88 by a pump assembly 89 which has a reciprocating piston 91. The pump assembly 89 is mounted on the underside of the plate 92 which is secured to the angle beams 17 and 18 and forms a platform for supporting the reservoir 88. The piston 91 of the pump assembly is in alignment with the shaft 31 and terminates in close proximity thereto. A screw 93 having a large sloping cam head 94 is threaded into the shaft 31 and rotated thereby so as to engage the piston 91 and move it in an upward direction against a compression spring 95. A fluid line 96 having a check valve 97 connects the pump assembly 89 with the reservoir 88 and permits fluid to flow from the reservoir into the pump assembly.

When the piston is moved in an upward direction the fluid insecticide in the pump assembly is forced through the fluid line 98 and a check valve 99 which permits the fluid to flow out of the pump assembly into a T-connection 101. A first fluid hose 102 is connected to the T-connection 101 and extends in a downward direction adjacent the upper end of the upright brush 42 so that the fluid insecticide will be discharged on the brush 42 as it rotates.

A second hose 103 connected to the opposite side of the T-connection 101 extends horizontally outward to a fluid container 104 which has an elongated flat wick 106 that extends down and engages the outer surface of the brush 27. The wick 106 carries the insecticide from the container 104 and slowly deposits the insecticide to the outer surface of the rotating brush 27. As shown in FIGS. 2 and 4, the wick 106 is positioned between the angle beams 17 and 18 by means of a pair of angle members 107 and 108 extended between and connected to the upper ends of the plates 28 and 29.

In use, the apparatus 10 is operated by an animal moving under the horizontal brush 27 to raise the frame 13 and close the switch 76 or by the animal breaking the light beam of the electric eye control to connect the electric motor to a source of electric power. The back and one side of the animal will be concurrently groomed by the rotating brushes 27 and 42 which are power driven by the electric motor 63. During the rotating movement of the respective brushes the pump assembly 89 will be operated as the cam head 94 of the screw 93 engages the piston 91 during each revolution of the shaft 31. This pumping action withdraws fluid insecticide from the reservoir 88 and forces the insecticide onto the rotating brushes 27 and 42. Thus, the brushes in conjunction with their grooming action apply limited amounts of insecticide to the body of the animal.

As soon as the animal leaves the apparatus the weight of the frame and brushes 27 and 42 carried thereby will carry the scratcher 10 in a downward direction against the biasing force of the springs 71 and 72 a limited distance which is sufficient to open the switch 76 thereby disconnecting the source of energy with the electric motor 63. The apparatus 10 is thus automatically returned to an inoperative position and is ready to be used by another animal.

While there have been shown, described, and pointed out the fundamental novel features of the invention as applied to a preferred embodiment, it is to be understood that various omissions, substitutions, changes in form, and details of the apparatus illustrated may be made by those skilled in the art, without departing from the spirit of the invention. It is intended to be limited only as indicated by the scope of the following claims.

I claim:
1. An apparatus for scratching an animal comprising:
   (a) frame means,
   (b) means supporting said frame means above the surface of the ground for movement from a first position to a second position.
   (c) brush means rotatably supported on said frame means, and engageable with a portion of the animal,
   (d) motor means mounted on said frame means operatively connected to said brush means for rotating said brush means, and
   (e) bumper means adjustably mounted on the frame means adjacent said brush means for adjustable movement laterally of said brush means and engageable with the animal to limit the pressure applied by the animal against said brush means.
2. An apparatus for scratching an animal comprising:
   (a) an inverted L-shaped frame,
   (b) means supporting said frame for movement in an up and down direction above the surface of the ground, (c) an upright brush means rotatably supported on said frame adapted to engage a side area of the animal, (d) a horizontal brush means rotatably supported on said frame adapted to engage a top area of the animal, (e) motor means operatively connected to said upright brush means and horizontal brush means for rotating said brush means on said frame, (f) control means for said motor means operative in response to up and down movement of said frame to connect and disconnect the motor means to a source of energy, and (g) bumper means adjustably mounted on the frame means adjacent to and along the contacting surface of said upright and horizontal brush means for adjustable movement transversely of said brush means to expose predetermined peripheral portions of said brush means whereby to limit the pressure applied by the animal against said brush means.

3. In an apparatus for grooming an animal, (a) frame means, (b) cylindrical brush means rotatably supported on said frame means and engageable with a portion of the animal, (c) bumper means positioned adjacent said brush means and along the length thereof to expose predetermined portions of the outer radial lengths of said brush means to the animal whereby to limit the pressure applied by the animal against said brush means, and (d) means adjustably mounted said bumper means on said frame means for movement radially of said brush means.

4. The apparatus defined in claim 3 including insecticide dispensing means mounted on said frame means and operative in response to rotation of said brush means to discharge insecticide onto said brush means.

References Cited by the Examiner

UNITED STATES PATENTS

| | | | |
|---|---|---|---|
| 2,238,872 | 4/41 | Mather et al. | 119—159 |
| 2,573,873 | 11/51 | Rhoades | 119—157 |
| 2,658,216 | 11/53 | Shusett et al. | 15—21 |
| 2,663,284 | 12/53 | Stonesifer | 119—157 |
| 2,721,538 | 10/55 | Latham | 119—91 |
| 2,822,564 | 2/58 | Crivelli | 15—21 |
| 3,035,293 | 5/62 | Larson | 15—21 |
| 3,060,473 | 10/62 | Vani | 15—21 |

SAMUEL KOREN, *Primary Examiner.*

ALDRICH F. MEDBERY, *Examiner.*